United States Patent Office 3,365,733
Patented Jan. 30, 1968

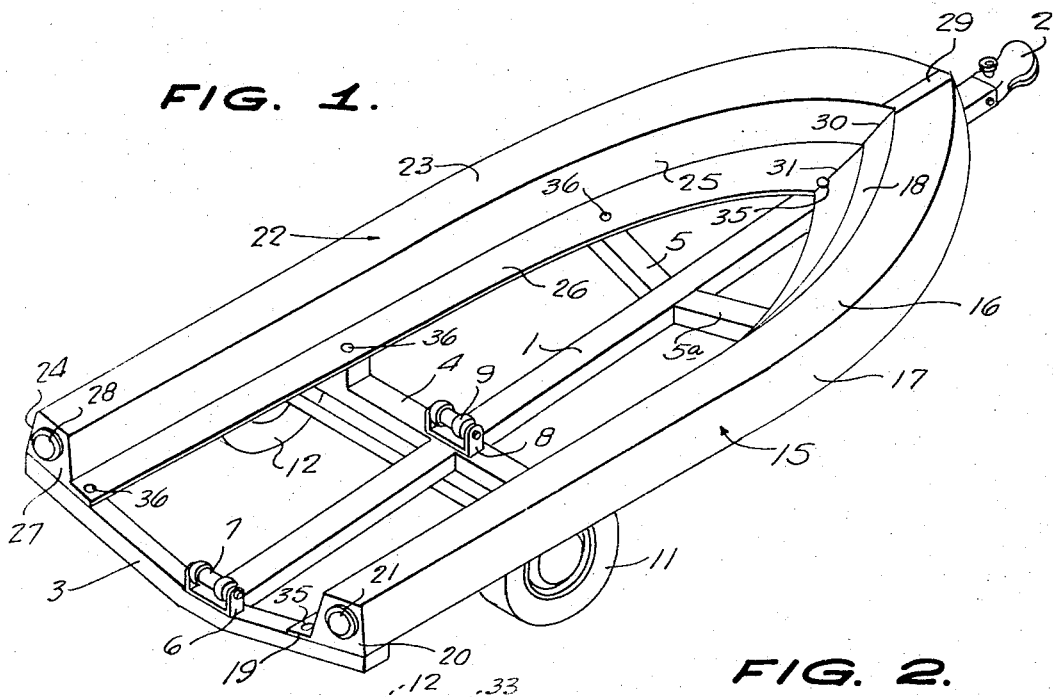

3,365,733
BOAT TRAILER
Clark Gudmundson, 267 East 550 North,
Bountiful, Utah 84010
Filed Feb. 1, 1966, Ser. No. 524,046
1 Claim. (Cl. 9—1)

ABSTRACT OF THE DISCLOSURE

The present boat trailer has a wheeled frame to be towed by a vehicle and a housing around the edges of the frame containing a floatable material whereby a boat can be supported between the housing on the frame.

---

The principle object of the present invention is to provide a boat trailer having a floatable walkway housing thereon and a low center gravity even when used with relatively large tired wheels and which floatable walkway housing can be readily attached to conventional new or used boat trailers or to a wheeled metal frame.

A further important object of the invention is to provide a boat trailer with a floatable walkway housing or such housing for connection to conventional boat trailers which trailer and housing are economical to produce and assemble to provide a boat trailer which supports and protects the bottom portion of the boat, prevents the boat from shifting laterally when mounted on the trailer, permits the boat to be floated on or off the trailer, can be propelled by the boat when the boat is mounted on the trailer while floating upon the water as well as providing fender wells for various size wheels to be used in conveying the trailer upon a solid surface.

Further objects of the invention will be in part obvious and in part pointed out in the following detailed description of the accompanying drawing, in which;

FIG. 1 is a top perspective view of a trailer in accordance with the present invention;

FIG. 2 is a top view of the trailer;

FIG. 3 is an end view of the boat loading end of the trailer, and

FIG. 4 is an enlarged cross-sectional view taken on line 4—4 of FIG. 2.

Referring now more particularly to the accompanying drawing wherein like and corresponding parts are indicated by similar reference characters, 1 designates a straight elongated center beam having a conventional trailer hitch 2 fixedly connected to the front or lead end of said beam 1. A bent support bar 3 is fixedly connected by welding, bolts, or the like at its center to the rear or load end of beam 1 extending laterally thereof. A support bar 4 is likewise fixedly connected at its center by welding, bolts or the like to an intermediate portion of beam 1 and also extends laterally thereof.

A pair of support bars 5 and 5a are each fixedly attached at one end by welding, bolts or the like to a front intermediate portion of bar 1 extending laterally thereof and on an upward slant.

A U-shaped bracket 6 is fixedly mounted on the center of support bar 3 and rotatably supports a roller 7 thereon. A second U-shaped bracket 8 is fixedly mounted on the center of support bar 4 and rotatably supports a second roller 9 thereon. It is to be appreciated that brackets 6 and 8 can be mounted at various positions in line with one another along beam 1 other than that as shown and likewise additional brackets and rollers can be mounted upon beam 1 in a like manner.

An axle 10 rotatably supports pneumatically tired wheels 11 and 12 at the opposite ends thereof while a spring 13 connected at its outer ends to support beam 4 by bolts (not shown) is also connected to axle 10 at its center by bolt 14.

One leg of a floatable walkway housing, which leg is generally indicated at 15 has a flat top 16, a flat outer side 17 and a flat slanting inner side 18 giving said leg a substantially inverted U-shaped cross-sectional configuration as shown in FIG. 4. A flange 19 is integral with or fixedly connected to inner side 18 and extends laterally thereof on a downward slant therefrom. A flat end wall 20 extends across and closes off the rear end of leg 15 and is integral with the sides 16, 17, and 18 or fixedly connected thereto by conventional means. A taillight or reflector 21 is mounted through end wall 20.

A second walkway housing leg 22 is of a similar cross-sectional configuration to leg 15 and has a flat top 23, flat outer side 24, flat outwardly slanting inner side 25 and a flange 26 integral with or fixedly connected to inner side 25 extending laterally thereof on a downward slant towards flange 19. A flat end wall 27 closes off the rear end of leg 22 and is integral with or fixedly connected to sides 23, 24, and 25. A taillight or reflector 28 is mounted through end wall 27.

Legs 15 and 22 are curved inwardly towards one another at the front end of bar 1 providing an ogival configuration to said housing while the leg tops and outerside walls 17 are fixedly joined together by a band 29 riveted or otherwise connected thereto and with the coinciding ends of walls 16, and 18 fixedly connected to the corresponding walls 23, 25 at 30 and also the abutting end of flanges 19 and 26 are fixedly connected together at 31 by a suitable adhesive such as epoxy, plastic or the like.

Legs 15 and 22 provide fender wells 32 and 33 respectively for the top portions of wheel 11 and 12 which partially extend therein. Said legs 15 and 22 are filled with a floatable material 34 such as cork, plastic, such as for example styrofoam or expanded Royalite produced by the U.S. Rubber Company except at the space provided thereby forming the fender wells 32 and 33.

Flange 19 is fixedly attached to the support bars 3, 4, and 5a and bar 1 by rivets or bolts 35 and similarly flange 26 is fixedly attached to support bars 3, 4, and 5 by rivets or bolts 36.

A frame consisting of beam 1 and support bars 3, 4, 5, and 5a are preferably formed of the metal but may also be of wood.

The legs 15 and 22 can be formed from woods, such as a boat grade of plywood, a light metal such as aluminum or a plastic such as Fiberglas or Royalite. Also said legs can be joined at their abutting front ends by materials suitable for fixedly connecting the material of which said legs are produced. That is, by a suitable wood glue, welding, epoxy, or other plastic joining materials. Similarly, end walls 20 and 27 are connected to said legs by such material depending upon the material from which the legs are produced.

Whereas the drawing disclose a complete boat trailer it is to be appreciated that joined legs 15 and 22 provide a floatable walkway housing which can be readily affixed by rivets, bolts and the like 35 and 36 to other types of frames such as, for example, a conventional trailer having a wheeled frame for being towed and rollers such as rollers 7–9 rotatably mounted thereon. That is, the housing consisting of joined legs 15 and 22 can be attached to a conventional trailer frame by means of the bolts or rivets 35 and 36 extending through flanges 19 and 26 and the portion of the conventional boat trailer frame therebeneath.

Taillights 21 and 28 can by suitable wiring (not shown) be connected to the electrical circuit of a towing vehicle having the other portion of a conventional trailer hitch detachably connected to the hitch 2.

In the use of the boat trailer with hitch 2 detached from the tow vehicle and support bar 4 adjacent the ground, a boat can be slid on to the rollers 7 and 9 and along the flanges 19 and 26 until the bow end of the boat reaches the connections 30 and 31 whereupon the inner side walls 18 and 25 will prevent the lateral movement of the boat. In this connection a winch can be mounted in a conventional manner upon the front end of beam 1 for having its rope or cable attached to the boat for pulling the boat on to the trailer. Thereafter, the beam 1 is moved to a horizontal position and hitch 2 connected to the tow vehicle for pulling the boat and trailer. The same procedure would be followed if the present floatable housing was attached to a conventional boat trailer.

However, by backing the trailer on to the water the floatable material 34 will cause the trailer to float partly submerged in the water so that a boat can be floated on to or off of the trailer as desired. With the boat mounted on the trailer and the trailer unhitched from a tow vehicle the propelling means of the boat can be used for propelling the boat mounted on the trailer over the surface of the water and it has been found that when so mounted the combination boat and trailer provides a greatly increased floatability to the boat so that, for example, a small boat, for example, of 13 to 20 feet in length has the floatability of a boat twice that length and can be propelled over rougher waters that the smaller boat could safely navigate. Also the present trailer or a conventional trailer with the floatable housing thereon will not tend to have the wheels sink into soft water bottoms and greatly assists in launching or retrieving the boat.

Further the flat tops 16 and 23 provide a walkway which enable a person to walk therearound or around the boat when mounted thereon which considerably assists in placing the boat on or off the trailer as well as getting in and out of the boat.

It is to be appreciated that the present invention is capable of considerable modifications and such changes thereto as come within the scope of the appended claims is deemed to be a part thereof.

I claim:

1. A boat trailer comprising an elongated frame having at least a center beam extending longitudinally of said boat trailer, and supports connected to and extending laterally of said beam, rollers rotatably mounted on said boat frame positioned in line longitudinally of said beam, an elongated housing fixedly mounted on said frame and having a pair of spaced apart legs each extending lengthwise of said frame, floatable material at least partially filling said housing, wheels, means connected to said frame and having said wheels rotatably mounted thereon and means for connecting said frame to a tow vehicle.

References Cited
UNITED STATES PATENTS

| | | | |
|---|---|---|---|
| 2,361,951 | 11/1944 | Livermon | 9—1 |
| 3,004,771 | 10/1961 | Moore | 9—1 X |
| 3,035,723 | 5/1962 | Brosch | 280—414 X |
| 3,224,019 | 12/1965 | Gudmundson | 280—414 X |

LEO FRIAGLIA, *Primary Examiner.*